United States Patent [19]
Iida et al.

[11] Patent Number: 5,697,710
[45] Date of Patent: Dec. 16, 1997

[54] BEARING SEALS AND BEARING AND SEAL ASSEMBLIES

[75] Inventors: Yoshimi Iida; Hideo Kawabata, both of Fukushima, Japan

[73] Assignee: Nok Corporation, Tokyo, Japan

[21] Appl. No.: 733,764

[22] Filed: Oct. 18, 1996

[30] Foreign Application Priority Data

Oct. 20, 1995 [JP] Japan ................................. 7-297849

[51] Int. Cl.$^6$ ...................................................... F16C 33/78
[52] U.S. Cl. .......................... 384/473; 384/474; 384/477; 384/484; 384/488
[58] Field of Search ............................... 384/473, 474, 384/484, 488, 477, 486

[56] References Cited

U.S. PATENT DOCUMENTS

| 4,699,526 | 10/1987 | Sato | 384/486 |
|---|---|---|---|
| 4,792,243 | 12/1988 | Takeuchi et al. | 384/486 |
| 5,000,587 | 3/1991 | Hawley | 384/478 |
| 5,242,229 | 9/1993 | McLarty | 384/484 |
| 5,370,404 | 12/1994 | Klein et al. | 384/484 |
| 5,454,647 | 10/1995 | Otto | 384/484 |

FOREIGN PATENT DOCUMENTS 56-52443   12/1981   Japan.

*Primary Examiner*—Lenard A. Footland
*Attorney, Agent, or Firm*—Jacobson, Price, Holman & Stern, PLLC

[57] ABSTRACT

A bearing seal suitable for sealing a bearing system (18) under extremely abrasive and damp conditions. The seal assembly (22) includes a metal casing (36) received in a housing (26) which defines a small annular gap (34) relative to a shaft (16) supported by the bearing system (18). The seal assembly (22) includes a first seal (42) and a second seal (48) spaced apart to define an annular space (60). The assembly (22) is provided with a plurality of passages (64/66) circumferentially spaced apart from one another. Upon pumping grease (76) under pressure into the bearing system, grease is forced to flow through the passages (64/66) whereby the annular gap (34) is filled with grease throughout substantially the entire circumference thereof. The mass of grease retained in the annular gap (34) serves as a barrier against water and abrasive particles. A bearing and seal assembly (10) is also disclosed.

12 Claims, 4 Drawing Sheets

BEARING SEALS AND BEARING AND SEAL ASSEMBLIES

BACKGROUND OF THE INVENTION

1. Field of the Invention

The present invention relates to bearing seals and bearing and seal assemblies which are suitable for use in an extremely severe environment.

2. Description of the Prior Art

In certain applications, antifriction bearings and seals therefor are operated under extremely abrasive and thermally severe conditions. In a continuous casting plant, for example, molten steel is cast and rolled into slabs or billets by hot-rolling mills as it is continuously withdrawn and cooled by cooling water sprayed thereover.

Throughout casting and hot-rolling, high temperature steel in contact with ambient air results in the formation of iron oxides which cover the surface of the work with a solid oxide layer known as "scale". During rolling, the scale is broken into flakes and particles which are then washed away by cooling water. Accordingly, wasted cooling water carries therein a large amount of scale particles which are highly abrasive as is well-known in the art. Therefore, the bearing assemblies supporting the rolls of the hot-rolling mills must be sealed by bearing seals to prevent ingress of abrasive particle-laden, wasted cooling water.

One of the conventional methods for protecting the bearing assemblies of the hot-rolling mills against water and abrasive particles is to arrange a pair of lip-type seals 1 and 2 in series at the inner side of a bearing 3 as shown in FIG. 1 and to pump grease intermittently or continuously through a grease fitting 4 into the bearing. As grease is pumped, water and foreign materials that may have entered into the bearing and seal assembly are displaced by the flow of grease and are purged out of the assembly. Grease as squeezed is finally discharged through an annular clearance 5 formed between a housing 6 and the roll journal 7.

However, it has been observed that a significant amount of scale particles are allowed to access the bearing seals so that the latter undergo a substantial wear due to abrasion. In addition, the elastomer material forming the sealing lips is degraded as time elapses due to heat transferred from the rolls. As a result, in some instances, the sealing function of the bearing seals is prematurely degraded. In that event, there is a risk of water seeping into the bearings thereby giving rise to the problem of insufficient lubrication of the bearings.

The essential requirement for the bearing assemblies for the rolls of the continuous casting plant is that none of the bearings must fail prior to predetermined periodical replacement. If otherwise even only one bearing would prematurely fail, the entire production line associated with the continuous casting plant must inadvertently be stopped for the sole purpose of replacement of the particular bearing assembly. Accordingly, any slightest ingress of water must be avoided.

SUMMARY OF THE INVENTION

It is therefore an object of the present invention to provide an improved bearing seal which is suitable to seal a bearing with a high degree of reliability under severe operating conditions.

Another object of the invention is to provide a bearing and seal assembly wherein the bearing is effectively protected against water and abrasive particles.

In one aspect, this invention provides a bearing seal which is designed for use in combination with a bearing system having means for admitting grease under pressure. The seal includes an annular casing adapted to be mounted within a housing. A first and a second seal members are mounted to the casing and are spaced from each other to define an annular space. The bearing seal is provided with a plurality of circumferentially spaced passages that communicate the annular space with an annular gap formed between a radial flange of the housing and the shaft.

In use, the bearing seal is installed within the housing between the bearing system and the radial flange. Upon pumping grease under pressure into the bearing, grease as squeezed is forced to flow through the circumferentially spaced passages so that the annular gap is filled with grease throughout substantially the entire circumference thereof. The mass of grease retained in the annular gap serves as a barrier against particle-laden, wasted cooling water and precludes water and abrasive particles from accessing the bearing system.

These features and advantages of the invention, as well as other features and advantages thereof, will become apparent from the following description.

DESCRIPTION OF THE PREFERRED EMBODIMENT

Figure 2:
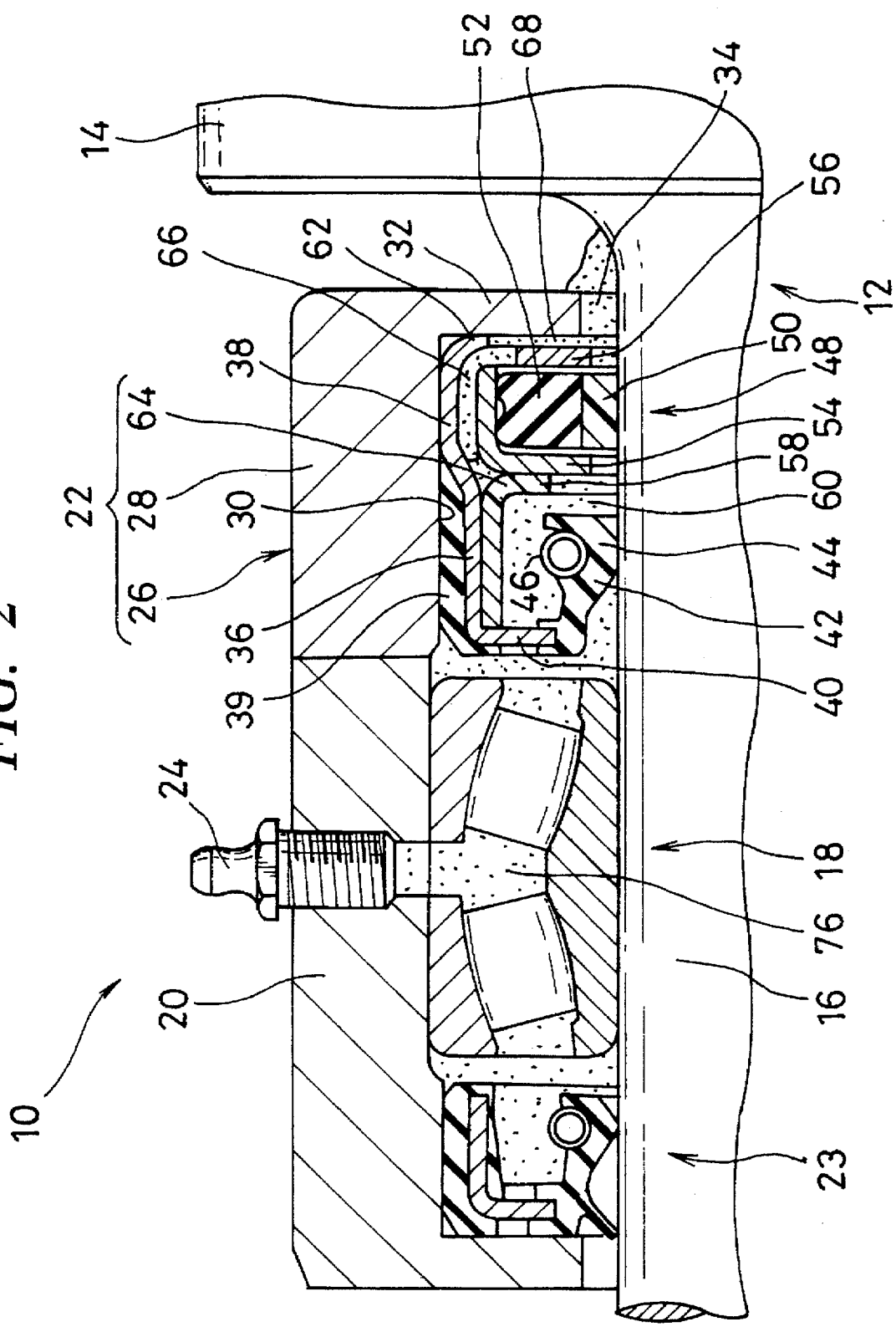
FIG. 2 is a fragmentary cross-sectional view showing the bearing and seal assembly according to the invention.

Referring to FIG. 2, there is shown a roll of a hot-rolling mill supported by a bearing and seal assembly 10 embodying the invention. Similar to the conventional design, the roll 12 includes a working portion 14 and a pair of journals, one of which is shown at 16.

The bearing and seal assembly 10 includes a conventional bearing assembly 18 rotatably supporting the journal 16 relative to a stationary housing 20. The bearing and seal assembly 10 further includes a sealing assembly 22 arranged inwardly of the bearing assembly 18 to seal the latter from dust and water. The term "inner" or "inwardly of" as used herein for an axial direction refers to the direction toward the central portion of the roll. Similarly, the term "outer" or "outwardly of" refers to the direction toward the ends of the roll. The bearing assembly 18 is sealed at the outer side thereof by a conventional lip-type bearing seal 23 which is designed and configured to prevent leakage of lubricant.

The housing 20 is provided with a grease fitting 24 for pumping grease into the bearing assembly 18. The grease fitting 24 may be connected to a remote automated pump for automatic lubrication. Typically, 2–3 milliliters of grease may be pumped into each bearing assembly 18 for every 30 minutes. Since the outer bearing seal 23 is designed to prevent leakage of grease, grease as pumped will be directed toward the sealing assembly 22 and will finally be discharged out of the sealing assembly 22 as described later.

The bearing and seal assembly 10 includes an auxiliary housing 26 serving as a housing for the sealing assembly 22.

To facilitate replacement of the sealing assembly 22, the auxiliary housing 26 is made separate from the housing 20 and is fastened thereto by any suitable means such as through-bolts, not shown.

The housing 26 includes an axially extending portion 28 defining a cylindrical recess 30 in which the sealing assembly 22 is accommodated. Extending from the inner end of the axially extending portion 28 is an inturned radial flange 32 which defines a small annular gap 34, in the order of 1–4 mm, relative to the outer diameter of the journal 16 of the roll.

The sealing assembly 22 includes an annular casing 36 made by stamping of sheet metal. The metal casing 36 has a stepped tubular mounting portion 38 to which an annular elastomeric member 39 is bonded and which is interference fitted within the recess 30.

The casing 36 includes an inturned bonding flange 40 to which a first sealing member 42 is bonded. The first sealing member 42 is made of a heat-resistant elastomeric material such as fluorocarbon rubber and extends axially inwardly of the bonding flange 40. The first sealing member 42 is configured to form a sealing lip 44 which is biased by a garter spring 46 into sealing engagement with the journal 16.

A second sealing mechanism 48 is mounted within the casing 36 axially inwardly of the first sealing member 42. The second sealing mechanism 48 includes an inner sealing ring 50 and an outer compression ring 52 which are confined in a guide casing made preferably by stamping of stainless steel sheet. In the embodiment shown, the guide casing is comprised of an outer casing 54 and an inner casing 56 of an L-shaped cross section which are closely fitted with each other.

The outer casing 54 is axially positioned with respect to the bonding flange 40 by an annular spacer 58 of an L-shaped cross section having an outer end abutting against the radial bonding flange 40. Accordingly, an annular space 60 is formed between the first sealing member 42 and the second sealing mechanism 48. The spacer 58, outer casing 54 and inner casing 56 are held together by crimping the axially inner end 62 of the casing 36 radially inwardly as shown.

The outer compression ring 52 is made of an elastomeric material and is confined within the guide casing 54/56 in a slightly compressed fashion so as to resiliently bias the inner sealing ring 50 into sealing contact with the journal 16. The inner sealing ring 50 is made of a heat-resistant, relatively hard, abrasion-resistant, low-friction material such as fluorocarbon resin, typically polytetrafluoroethylene.

Figure 3:
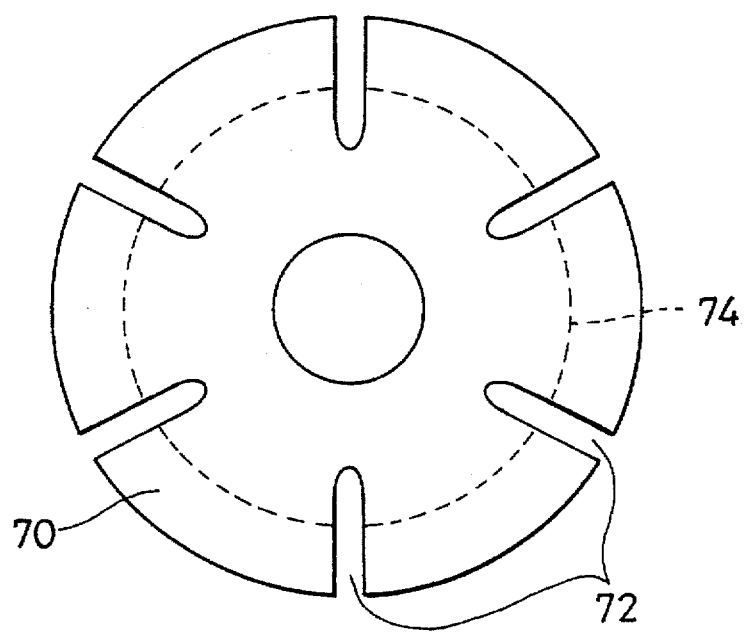
FIG. 3 is a plan view of a sheet metal blank for use in making a guide casing shown in FIG. 2; and, FIGS. 4–6 are views similar to FIG. 2 but showing modified embodiments of the bearing and seal assembly.

The annular space 60 between the first and second seals 42 and 48 is in communication with the annular gap 34 through a plurality of circumferentially spaced passages 64 formed across the spacer 58, a plurality of axially extending passages 66 formed on the circumferential wall of the guide casing 56, and an annular space 68 defined between the casing 56 and the radial flange 32 of the housing 26. The casing 56 with the axial passages 66 may be formed by preparing a circular sheet metal blank 70 provided with a plurality of recesses 72 angularly equally spaced apart from each other as shown in FIG. 3 and by stamping the blank along a circular bending line 74.

During use, the sealing ring 50 of the second seal mechanism 48 will be substantially free from wear and thermal degradation as it is made of a abrasion-resistant, heat-resistant resin. Accordingly, a good sealing contact will be established for a long period of time between the ring 50 and the journal 16 of the roll to prevent not only ingress of water and abrasive particles but also release of grease.

When grease 76 is pumped into the bearing assembly 18, any pressure rise developed in the mass of grease will bring the outer bearing seal 23 into sealing engagement with the journal with an increased sealing pressure. Accordingly, there will be no leakage of grease through the outer bearing seal 23.

Grease under pressure will cause the sealing lip 44 of the first sealing member 42 to yield radially outwardly away from the journal 16 so that grease is permitted to pass the first sealing member 42 to flow into the annular space 60. Since the sealing ring 50 as biased by a compression ring 52 is brought into good sealing contact with the journal 16 as mentioned before, grease is not allowed to pass between the ring 50 and the journal. Accordingly, grease under pressure in the annular space 60 will be forced to flow through the passages 64 and 66 on its way to the annular space 68.

On doing so, grease will be distributed circumferentially equally over the respective passages 64 and 66. Grease leaving the passages 66 will then be directed radially inwardly into the annular space 68 and will be convergingly squeezed toward the annular gap 34. As a result, the annular gap 34 will be filled with grease throughout the entire circumference thereof. Grease will be displaced through the gap 34 and will be finally discharged out of the sealing assembly 22.

As in this manner the annular gap 34 is constantly filled with grease throughout the entire circumference, the mass of grease held in the gap 34 will serve as a barrier to preclude scale particle-laden wasted cooling water from entering the sealing assembly 22. In addition, the second sealing mechanism 48 prevents ingress of abrasive particles and the first seal 42 serves to preclude intrusion of water. Accordingly, the sealing assembly 22 operates to maintain the bearing assembly 18 in a good condition.

Figure 1:
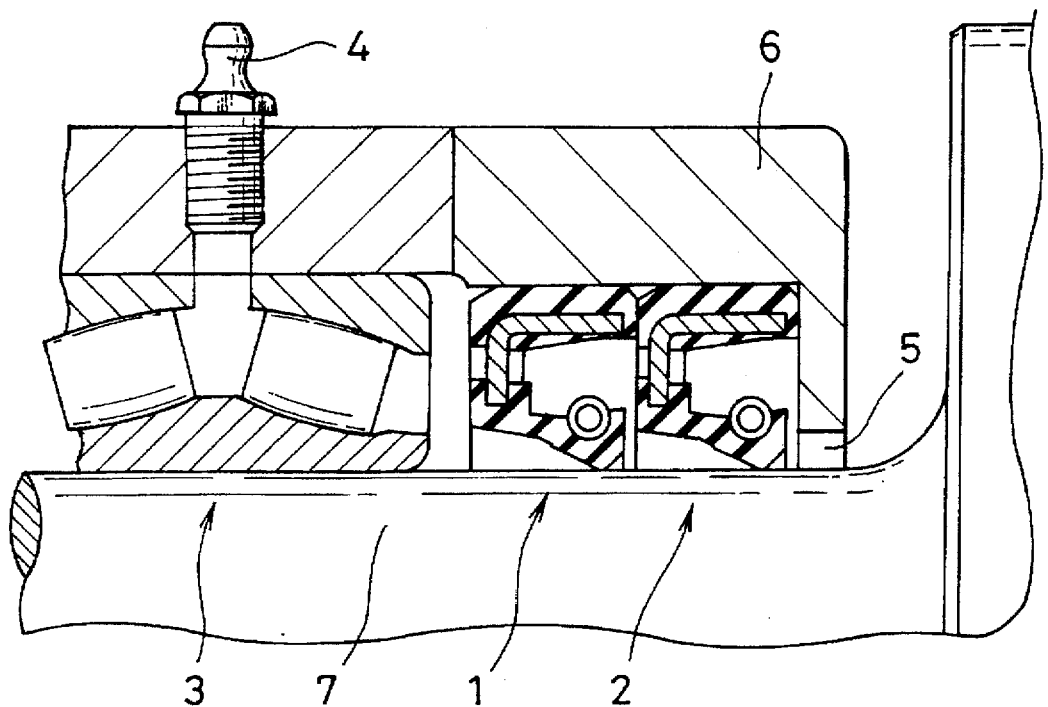
FIG. 1 is a fragmentary cross-sectional view showing the prior art sealing arrangement for a bearing system for a continuous casting plant.

The sealing arrangement according to the invention provides a substantial advantage over the conventional sealing arrangement shown in FIG. 1.

In the prior art arrangement illustrated in FIG. 1, the elastomeric material forming the seals 1 and 2 will be gradually degraded due to heat transferred from the roll so that the sealing pressure acting on the journal will be decreased in response to a lapse of time. When grease is pumped into the bearing assembly 3 and is squeezed to flow past the inner seal 2, an outburst of grease will take place at a particular angular point in the circumferential periphery of the journal where the sealing pressure is the minimum. As a result, grease would not be squeezed or extruded in the form a tubular film but would be directed toward the annular gap 5 in an uneven fashion as viewed in the circumferential direction. Therefore, the annular gap 5 would not be filled with grease throughout its entire circumference, thereby leaving some angular areas which are void of grease. Accordingly, in the conventional sealing arrangement of FIG. 1, there is a risk that scale particle-laden cooling water may enter through such voids thereby permitting abrasive particles of scale to access the bearing seal. As the roll is rotated, scale particles thus entered will be carried in the direction of rotation and will be admixed with grease. This will promote premature wear of the sealing lips so that there is a risk of water accessing the bearing assembly.

In contrast, the sealing arrangement of the invention advantageously prevents ingress of scale-laden cooling water, as described before.

The present inventors have carried out a comparative experiment wherein the bearing and seal assembly according to the invention illustrated in FIG. 2 and the conventional bearing and seal assembly similar to that shown in FIG. 1 are subjected, respectively, to 500 hours of testing. During testing, 2.5 milliliters of grease was pumped into respective bearing assemblies for every 30 minutes. After 500 hours of operation, grease was sampled out of respective bearing assemblies and the samples were subjected to measurement to detect the water content in grease. The water content of grease in the bearing and seal assembly according to the invention was less than 0.1%. In view of the initial water content of grease to be equal to or less than about 0.1%, it was observed that there was no ingress of water. In contrast, the water content of grease in the conventional bearing and seal assembly was 3.9% meaning that a small amount of water has entered into the bearing assembly.

Figure 4:
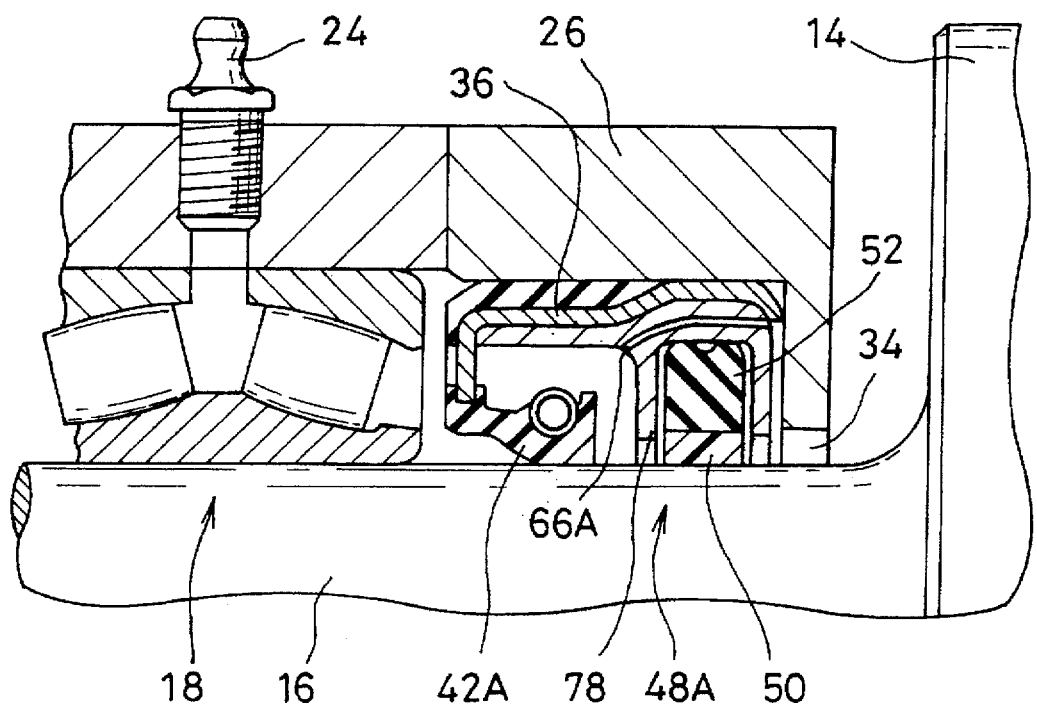
Figure 5:
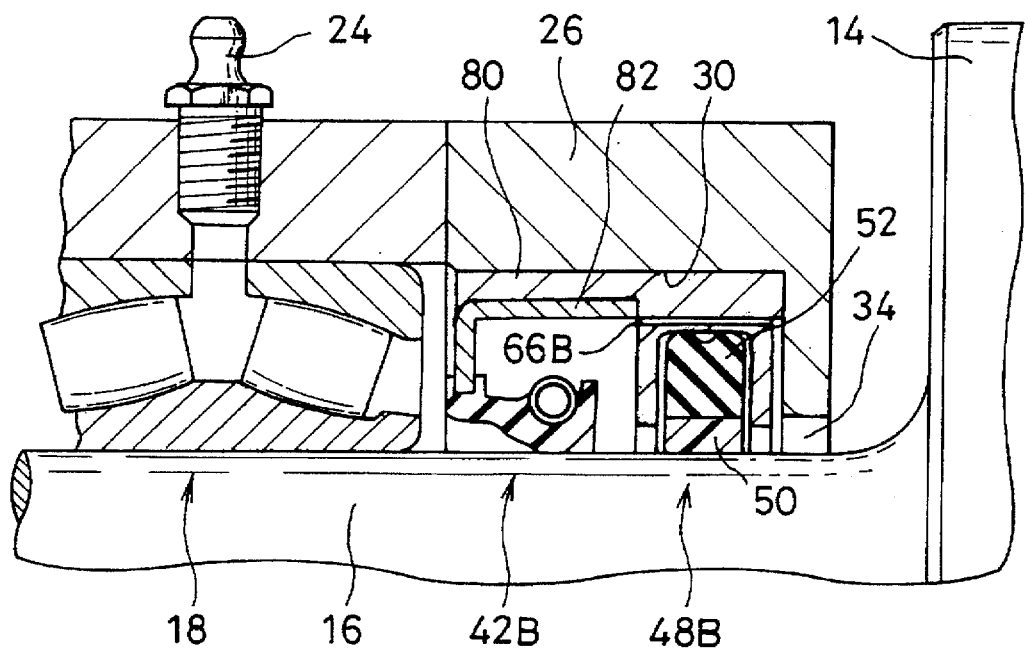
Figure 6:
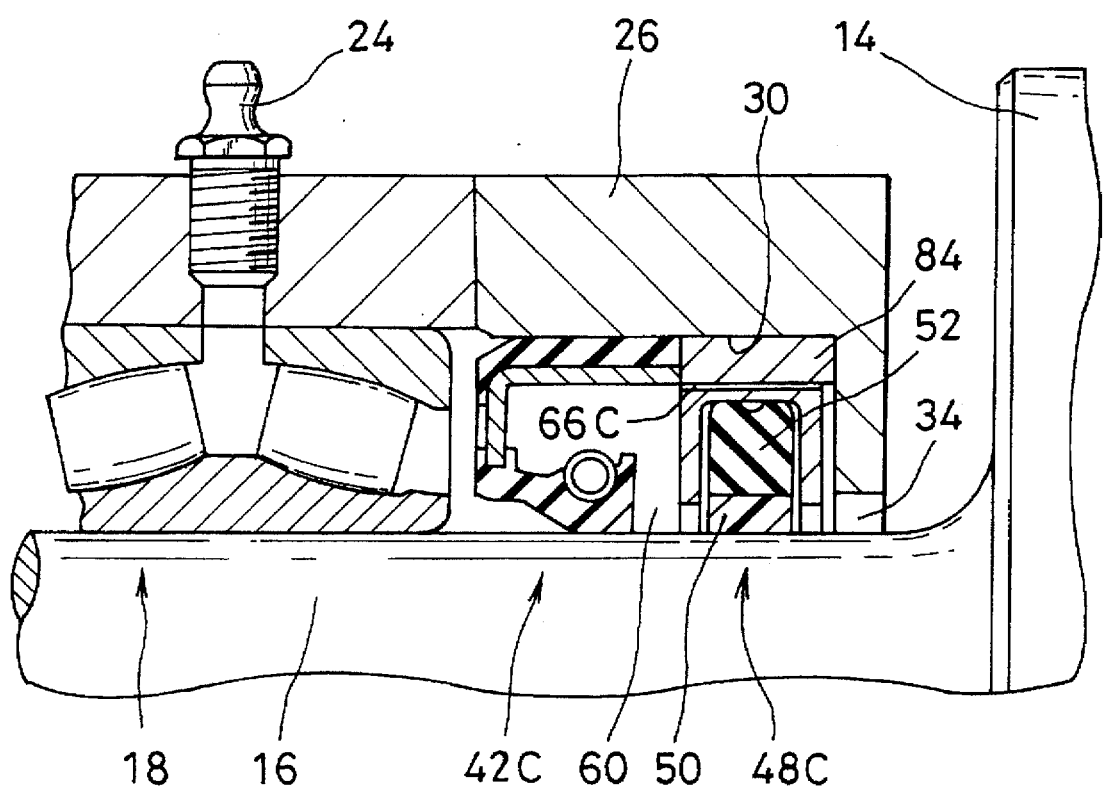

FIGS. 4-6 illustrate various modified versions of the bearing seal assembly of the invention. Throughout these drawings, parts and members similar to those shown in FIG. 2 are designated by like reference numerals and will not be described again.

In the embodiment shown in FIG. 4, the sealing ring 50 and the compression ring 52 are confined in a single-piece guide casing 78 across which a plurality of passages 66A are provided. In the example illustrated in FIG. 5, a guide casing 80 of the second sealing assembly 48B extends throughout and is closely fitted within the recess 30 and a metal casing 82 of the first seal 42B is received within the guide casing 80. A plurality of passages 66B are similarly provided across the guide casing 80.

In the embodiment shown in FIG. 6, the first sealing assembly 42C and the second sealing assembly 48C are made separate from one another and are arranged in sequence in the annular recess 30 formed in the housing 26. A plurality of passages 66C are similarly formed across the guide casing 84 of the second sealing assembly 48C.

Throughout various embodiments shown in FIGS. 4-6, the annular gap 34 will be filled with grease along the entire circumference thereof in a manner similar to the first embodiment shown and described with reference to FIG. 2. Accordingly, the bearing assembly 18 will be effectively protected from ingress of water and scale particles.

While the present invention has been described herein with reference to the specific embodiments thereof, it is contemplated that the present invention is not limited thereby and various changes and modifications may be made therein for those skilled in the art without departing from the scope of the invention.

What is claimed is:

1. A sealing device for a bearing system for a rotatable shaft, said bearing system having a bearing received in a housing to support the shaft, said housing being provided with means for admitting grease under pressure into the bearing, said housing having an inturned inner radial flange defining a small annular gap relative to the shaft, said sealing device comprising:

an annular casing fluid tightly mountable within said housing inwardly of the bearing;

a first and a second seal mounted to said casing for sealing the shaft, said second seal being disposed inwardly of said first seal to define an annular space between said first and second seals; and, passage means, including a plurality of passages circumferentially spaced apart from one another, for communicating said annular space with said annular gap whereby, upon installation of the sealing device within the bearing system and upon pumping grease under pressure into the bearing, grease is forced to flow through said first seal into said annular space and is displaced therefrom through said passage means toward the annular gap so that the annular gap is filled with grease throughout substantially the entire circumference thereof.

2. A sealing device according to claim 1, wherein said first seal includes a sealing lip of an elastomeric material and said second seal includes a sealing ring of a heat-resistant, abrasion-resistant resin.

3. A sealing device according to claim 2, wherein said second seal includes a compression ring of an elastomeric material for biasing the sealing ring into sealing contact with the shaft, said sealing device further including a guide casing in which said compression ring is confined, and wherein said passages are formed across a wall of said guide casing.

4. A sealing device according to claim 3, further comprising a spacer ring for positioning the guide casing relative to the first seal, said spacer ring being provided with a plurality of through passages circumferentially spaced apart from one another.

5. A sealing device according to claim 2, wherein the sealing ring is made of polytetrafluoroethylene.

6. A sealing device for a bearing system for a rolling mill of a continuous casting plant, said bearing system having a bearing received in a housing to support a journal of a rolling roll flooded with cooling water, said housing being provided with means for admitting grease under pressure into the bearing, said housing having an inturned inner radial flange defining a small annular gap relative to the roll journal, said sealing device comprising:

an annular casing fluid tightly mountable within said housing inwardly of the bearing;

a first and a second seal mounted to said casing for sealing the journal, said second seal being disposed inwardly of said first seal to define an annular space between said first and second seals; and, passage means, including a plurality of passages circumferentially spaced apart from one another, for communicating said annular space with said annular gap whereby, upon installation of the sealing device within the bearing system and upon pumping grease under pressure into the bearing, grease is forced to flow through said first seal into said annular space and is displaced therefrom through said passage means toward the annular gap so that the annular gap is filled with grease throughout substantially the entire circumference thereof to thereby prevent ingress of scale-laden cooling water.

7. A bearing and seal assembly for a rotatable shaft, which comprises:

a bearing assembly having a housing and a bearing received in the housing for supporting the shaft, said housing being provided with means for admitting grease under pressure into the bearing, said housing having an inturned inner radial flange defining a small annular gap relative to the shaft;

a first and a second seal disposed within said housing inwardly of the bearing for sealing the shaft with respect to said housing, said second seal being disposed inwardly of said first seal to define an annular space between the first and second seals; and, passage means, including a plurality of passages circumferentially spaced apart from one another, for communicating said annular space with said annular gap whereby, upon pumping grease under pressure into the bearing, grease is forced to flow through said first seal into said annular space and is displaced therefrom through said passage means toward the annular gap to thereby fill the annular gap over substantially the entire circumference thereof.

8. A bearing and seal assembly according to claim 7, wherein said first and second seals are mounted within a common casing received in said housing.

9. A bearing and seal assembly according to claim 7, wherein said first seal includes a sealing lip of an elastomeric material and said second seal includes a sealing ring of a heat-resistant, abrasion-resistant resin.

10. A bearing and seal assembly according to claim 9, wherein the sealing ring is made of polytetrafluoroethylene.

11. A bearing and seal assembly according to claim 9, wherein said second seal includes a compression ring of an elastomeric material for biasing the sealing ring into sealing contact with the shaft, said assembly further including a guide casing in which said compression ring is confined, and wherein said passages are formed across said guide casing.

12. A bearing and seal assembly according to claim 11, further comprising a spacer ring for spacing the guide casing away from the first seal, said spacer ring being provided with a plurality of through passages circumferentially spaced apart from one another.

* * * * *